(12) United States Patent
DeBoer et al.

US008402431B2

(10) Patent No.: US 8,402,431 B2
(45) Date of Patent: Mar. 19, 2013

(54) SYSTEM AND METHOD FOR COMMUNICATING WITH A MICROCONTROLLER

(75) Inventors: Todd DeBoer, Duluth, GA (US); Peter Carbone, Tokyo (JP); Jeff Waldman, Hillsborough, NJ (US); Dave Johnson, San Jose, CA (US); Rob Dautel, Draper, UT (US)

(73) Assignee: Renesas Electronics America Inc., Santa Clara, CA (US)

( * ) Notice: Subject to any disclaimer, the term of this patent is extended or adjusted under 35 U.S.C. 154(b) by 1014 days.

(21) Appl. No.: 12/421,528

(22) Filed: Apr. 9, 2009

(65) Prior Publication Data

US 2009/0293040 A1 Nov. 26, 2009

Related U.S. Application Data

(60) Provisional application No. 61/043,685, filed on Apr. 9, 2008.

(51) Int. Cl.
*G06F 9/44* (2006.01)
*G06F 9/45* (2006.01)
(52) U.S. Cl. .................. 717/109; 717/110; 717/140
(58) Field of Classification Search .......... 717/109–110, 717/124–127, 140–144
See application file for complete search history.

(56) References Cited

U.S. PATENT DOCUMENTS

| | | | | |
|---|---|---|---|---|
| 6,237,136 B1 * | 5/2001 | Sadahiro | ........................ | 717/110 |
| 6,487,713 B1 * | 11/2002 | Cohen et al. | ................... | 717/105 |
| 7,089,530 B1 * | 8/2006 | Dardinski et al. | ............. | 717/105 |
| 7,191,433 B2 * | 3/2007 | Narad et al. | ................... | 717/140 |
| 7,275,241 B2 * | 9/2007 | Choi et al. | ..................... | 717/143 |
| 7,367,028 B2 * | 4/2008 | Kodosky et al. | ............... | 717/177 |
| 7,576,647 B1 * | 8/2009 | Mudge | ........................... | 340/541 |
| 7,627,860 B2 * | 12/2009 | Kodosky et al. | ............... | 717/141 |
| 7,644,394 B2 * | 1/2010 | Arnold et al. | .................. | 717/128 |
| 7,657,873 B2 * | 2/2010 | Horton et al. | .................. | 717/125 |
| 7,665,068 B2 * | 2/2010 | Neumann et al. | .............. | 717/125 |
| 7,681,176 B2 * | 3/2010 | Wills et al. | ..................... | 717/109 |
| 7,725,881 B2 * | 5/2010 | Bhat et al. | ...................... | 717/124 |
| 7,735,070 B2 * | 6/2010 | von der Ahe et al. | ......... | 717/140 |
| 7,770,151 B2 * | 8/2010 | Sanjar et al. | ................... | 717/109 |
| 7,818,682 B2 * | 10/2010 | Brand et al. | ................... | 715/763 |
| 7,873,942 B2 * | 1/2011 | Shaburov et al. | ............. | 717/109 |
| 7,984,423 B2 * | 7/2011 | Kodosky et al. | ............... | 717/113 |
| 8,266,594 B2 * | 9/2012 | Balasubramanian | .......... | 717/125 |
| 8,302,073 B2 * | 10/2012 | Caceres et al. | ................ | 717/109 |

OTHER PUBLICATIONS

Sentilles et al, "Save IDE—an integrated development environment for buildiing predictable component based embedded systems", IEEE, pp. 493-494, 2008.*
Hou e al, "An empirical analysis of the evolution of user visible features in an integrated development environment", ACM, pp. 122-135, 2009.*
Alameda et al, "The eclipse parallel tool platform", ACM XSEDE, pp. 1-8, 2012.*
Ortin et al, "IDE support to facilitate the transition from rapid prototyping to robust software production", ACM TOPI, 40-43, 2011.*

* cited by examiner

*Primary Examiner* — Anil Khatri
(74) *Attorney, Agent, or Firm* — Campbell Stephenson LLP

(57) ABSTRACT

A system for communicating with a microprocessor includes an interface agent that facilitates a communications link between customized windows applications and a suite of development tools. The system allows for interactive hardware and software verification testing of a microcontroller or microprocessor contained within any type of platform, such as mass produced electronic subassembly, consumer product, or a demonstration board. The system also allows for interactive tutorials about the suite of development tools and capabilities of a selected microcontroller or microprocessor. The interface agent affords a high level of interactivity during the tutorials, which involves requesting the user to perform tasks and monitoring for execution of the tasks.

28 Claims, 7 Drawing Sheets

10

16 — Host Computer

20 — User Interface

22 — Interface Agent

24 — First Software Component

26 — Second Software Component

18 — Integrated Development Environment (IDE)

IDE/GUI

19

14 — Target Board

12 — Target Microcontroller or Microprocessor

FIG. 1

SYSTEM AND METHOD FOR COMMUNICATING WITH A MICROCONTROLLER

This application claims the benefit of U.S. Provisional Application No. 61/043,685, filed Apr. 9, 2008, which is incorporated herein by reference.

FIELD OF THE INVENTION

This invention relates generally to microcontrollers and microprocessors and, more particularly, to systems and methods for developing microcontroller and microprocessor applications.

BACKGROUND OF THE INVENTION

Microcontrollers are used in a wide range of applications, such as consumer products, office equipment, industrial equipment, and communications, just to name a few. Use of a microcontroller often requires an engineer to evaluate the function and performance of various microcontroller models from different vendors to determine which one should be used. Also, use of a microcontroller often requires an engineer to develop software to be downloaded or programmed into the microcontroller.

Most engineers consider the selection of software development tools and access to pre-developed code, such as drivers, middleware, and sample projects, as primary factors in selecting a microcontroller vendor. Thus, after a suitable microcontroller has been identified, the engineer's focus shifts to the software tools, drivers, sample code, etc., all of which must be evaluated before the best microcontroller is selected.

Microcontroller vendors often send their own engineers to the user's site to help the user in the evaluation, selection, and development process, which is a manpower intensive solution that has to be scheduled in advance. Various devices, such as evaluation kits, starter kits, debuggers, and emulators, have been used to help in the evaluation, selection, and/or development processes. Some of these devices allow the user to communicate with the microcontroller through an integrated development environment, which often includes a graphical user interface that allows the user to control various development tools, such as a source code editor, compiler, linker, debugger, and analysis utilities. A drawback with prior systems is that they still lack a level of interactivity and ease of use afforded by customized interfaces which the user or microcontroller manufacturer may tailor for any purpose, including but not limited to performing experiments on the microcontroller, developing programs for use with the microcontroller, testing programs in the microcontroller, and tutorials on how to perform these and other tasks.

Accordingly, there is a need for a system and method for communicating with a microcontroller with a greater level of interactivity to facilitate evaluation of microcontrollers and associated support products, to facilitate development of software programs for use with microcontrollers, and to reduce time and costs associated with such activities.

SUMMARY OF THE INVENTION

Briefly and in general terms, the present invention is directed to systems and methods for communicating with a microdevice, for training a person to use an integrated development environment, and for developing or testing a software program for a microdevice.

In aspects of the present invention, a system comprises a host computer adapted to communicate with a target microdevice, the target microdevice being a microcontroller or a microprocessor, the host computer including a host memory coupled to the host computer, a graphical user interface adapted to obtain user inputs from a user, an interface agent adapted to handle information flow between the graphical user interface and an integrated development environment stored in the host memory. In further aspects, the graphical user interface includes a multimedia software program stored in the host memory. In detailed aspects, the integrated development environment is adapted to compile source code to build a target program according to information from the graphical user interface and, when the host computer is connected to the target microdevice, is further adapted to download the target program to the target microdevice according to the information from the graphical user interface.

In aspects of the present invention, a system comprises a host computer including a host memory coupled to the host computer, a graphical user interface adapted to obtain user inputs from a user, an interface agent adapted to handle information flow between the graphical user interface and an integrated development environment stored in the host memory. In further aspects, the system further comprises a target microdevice that is not part of the host computer, the host computer configured to communicate with the target microdevice, the target microdevice being a microcontroller or a microprocessor. In detailed aspects, the host computer is connected to the target microdevice, the integrated development environment is adapted to download a target program to the target microdevice according to information from the graphical user interface.

In aspects of the present invention, a method comprises displaying a graphic window on a display screen of a host computer. The method further comprises, requesting through the graphic window that a user establish a communication link from the target microdevice, to the host computer, the target microdevice being a microcontroller or a microprocessor. The method further comprises, determining whether a software program in the target microdevice has a desired configuration by having the user confirm an expected operational status of a peripheral device operatively connected to the target microdevice, the expected operational status defined by the desired configuration of the software program.

In aspects of the present invention, a method comprises displaying a graphic window on a display screen of a host computer, the host computer in communication with a target microdevice, the target microdevice being a microcontroller or a microprocessor. The method further comprises requesting through the graphic window that a user open an integrated development environment application, the integrated development environment application including a compiler. The method further comprises verifying that the user has opened the integrated development environment application by monitoring for the existence of a window in the integrated development environment application on the display screen.

In aspects of the present invention, a method comprises running a graphical user interface program on a host computer operatively connected to a target microdevice, the target microdevice being a microcontroller or a microprocessor. The method further comprises running an integrated development environment application on the host computer, the integrated development environment application capable of compiling a source code to build a target program for the target microdevice. The method further comprises causing the integrated development environment application to provide or obtain target information from memory embedded in the target microdevice, the target information provided or obtained according to information flow between the graphical user interface program and the integrated development environment application.

A method according to aspects of the present invention comprises displaying a graphic window on a display screen of a host computer, and communicating through the graphic window to the person an explanation of a user interface integral to an integrated development environment (IDE), the IDE configured to execute a task, the task selected from the group consisting of editing a source code, compiling a program, linking a program, and assembling a program. The method further comprises requesting through the graphic window that the person initiate the task through the user interface of the IDE, and monitoring whether the person has initiated the task.

In aspects of the present invention, a method comprises displaying a graphic window on a display screen of a host computer, the host computer operatively connected to a target microdevice, the target microdevice being a microcontroller or a microprocessor. The method further comprises providing to a person access through the graphic window a preselected group of commands for executing a function of an integrated development environment (IDE) in communication with the target microdevice, the function selected from the group consisting of editing a source code, compiling a program, linking a program, assembling a program, and communicating a program to the target microdevice. The graphic window includes graphical elements that are not part of a user interface integral to the IDE.

The features and advantages of the invention will be more readily understood from the following detailed description which should be read in conjunction with the accompanying drawings.

BRIEF DESCRIPTION OF THE DRAWINGS

FIG. 1 is a block diagram of a system for communicating with a microcontroller.

DETAILED DESCRIPTION OF THE PREFERRED EMBODIMENTS

Figure 2:
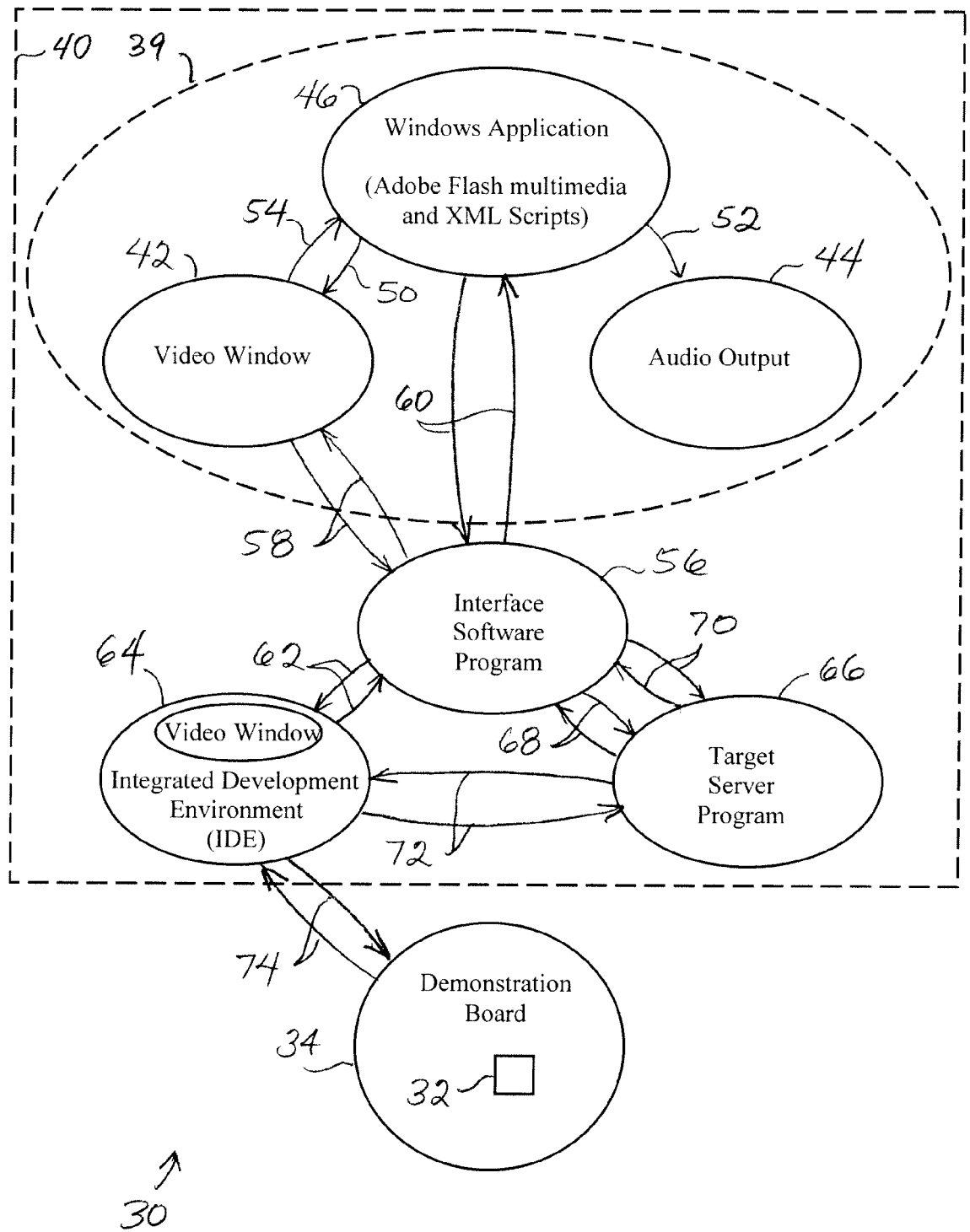
FIG. 2 is a block diagram of a system for communicating with a microcontroller on a demonstration board.

As used herein, the term "microdevice" is either a microcontroller or a microprocessor. A "microcontroller" refers to an integrated circuit that incorporates a central processing unit, a memory, and input/output functions. When non-volatile memory is omitted from the microcontroller, it is referred to as a microprocessor.

As used herein, "computer" refers to any processor-based device, assembly, or product, which includes without limitation a personal computer, desktop computer, and laptop computer. A computer may include user interface elements, such as a display screen for allowing a user to view graphics and data and a keyboard and mouse for allowing the user to enter data and interact with graphics shown on the display screen.

Referring now in more detail to the exemplary drawings for purposes of illustrating embodiments of the invention, wherein like reference numerals designate corresponding or like elements among the several views, there is shown in FIG. 1 a system 10 for communicating with a target microcontroller 12 on a target board 14. The target microcontroller 12 may be one that is selected by the user for evaluation, performance measurement, or development. The target board 14 includes a circuit board carrying the target microcontroller 12 and circuitry for interfacing with the target microcontroller. The target board 14 may be assembled by the user or obtained by the user from the target microcontroller vendor or from a third party. A host computer 16 is operatively connected to the target board 14 in such a way to allow for two-way communication between the host computer 16 and the target microcontroller 12.

As used herein, "operatively connected" refers to a connection which allows for cooperation of elements, and includes without limitation hardwired and wireless communication allowing for one-way and/or bi-directional exchange of information between the elements.

In FIG. 1, the host computer 16 includes data storage media capable of storing electronic or digital data. Data storage media, also referred to as computer memory, includes without limitation any one or a combination of a hard drive, optical drive, disc drive, flash memory, random-access memory (RAM), and read-only memory (ROM).

Stored in the memory of the host computer 16 is a group of programs referred to as an integrated development environment (IDE) 18 which the user may utilize for editing, building, and debugging software code and programs for use in the target microcontroller 12. Individual development tools within the integrated development environment may include without limitation a source code editor, assembler, linker, debugger, compiler, and analysis tools.

In other embodiments, the integrated development environment may be a single program including functions for editing, building, and debugging software code and programs for use in the target microcontroller 12.

Referring again to FIG. 1, The integrated development environment 18 communicates with the target microcontroller 12. In some embodiments, the integrated development environment is a suite of development tools provided by a microcontroller vendor or by a third party. A non-limiting example of an integrated development environment is the High-performance Embedded Workshop (HEW) from Renesas Technology Corp., Tokyo, Japan.

The integrated development environment 18 may also include a graphical user interface 19, referred to herein the IDE/GUI. The IDE/GUI 19 is an interface that allows the user to interact with all the development tools of the integrated development environment. In some embodiments, the IDE/GUI 19 is implemented by a Windows operating system of the host computer 16. In some embodiments, the IDE/GUI 19 is an integral part of the integrated development environment in that the IDE/GUI does not operate in the absence integrated development environment.

In some embodiments, the IDE/GUI includes a group of graphical windows displayed on the display screen of the host computer, there being a graphical window for one or more of the development tools. The graphical windows include graphical elements shown on the computer display screen that allow the user to control and operate the integrated development environment 18.

The host computer 16 of FIG. 1 includes a user interface 20 which is operated and controlled by one or more software programs stored in the memory of the host computer 19. In some embodiments, the user interface 20 is implemented by a Windows operating system of the host computer 16 and includes graphical elements that are not part of the IDE/GUI 19. As explained below, the user interface 20 is distinct from the IDE/GUI 19.

In some embodiments, the user interface 20 may be used for training a user how to utilize the IDE/GUI 19. The user interface 20 may provide the user with visual and audio cues, prompts, and messages, which explain various icons, window areas, tabs, and other elements of the IDE/GUI. The user interface 20 may also be used for other purposes besides training.

In some embodiments, the user interface 20 sends information to the IDE/GUI 19 in accordance with a software program that is not part of the integrated development environment 18 and/or in accordance with user inputs made through the user interface 20.

In a non-limiting example, the user interface 20 may include two graphical control elements, such as two graphical depictions of push buttons, shown on the display screen of the host computer 16. When the integrated development environment (IDE) 18 is running and when a user clicks on or activates one of the control elements, information is sent to the IDE that causes the IDE to execute a function, such as establishing a communication link to a microcontroller and downloading a program to the target microcontroller 12. When the user clicks or activates the other control element, information is sent to the IDE which causes the IDE to execute a different function, such as starting the program that was downloaded to the target microcontroller 12 in order to test the program. Thus, it will be appreciated that, as compared to the IDE/GUI which may provide access to all the functions of the IDE, the user interface 20 may provide the user with a relatively streamlined or quick access to a preselected set of functions of the IDE that are of particular interest to the user.

In a further example, the user interface 20 may include multiple layered windows shown on the display screen of the host computer 16. Each window including a tab that allows the user to bring any one of the windows forward as the top layer. Each window may, through various graphical control elements, provide access to a different grouping of preselected functions, tools, and/or utilities of the IDE 18. Thus, it will be appreciated that the user interface 20, in some embodiments, may provide the user with a customized grouping of the IDE functions, tools, and/or utilities that is organized or accessed differently than in the IDE/GUI 19. That is, the user interface 20 may provide a customized way to access the IDE functions, tools, and/or utilities.

A user may provide input through the user interface 20 through the use of any one or a combination of input devices, including without limitation a keyboard, a keypad, a touch sensitive screen, a touch pad, a mouse or other pointing device. The user interface 20 may be controlled by one or more software programs.

In some embodiments, the software program for the user interface 20 may be created by the user, the manufacturer of the target microcontroller 12, or a third party using WINDOWS® application development tools which support MICROSOFT® Visual Basic or Visual C++. The user interface 20 may incorporate a combination of text, audio, still images, animation, video, and interactive content forms, collectively referred to herein as multimedia, through the use of FLASH® technology from Adobe Systems Incorporated, San Jose, Calif. A multimedia window or multimedia interface may include any one or a combination of text, audio, still images, animation, video, and interactive content forms. These multimedia elements may work in cooperation with user input hardware, such as a keyboard, a keypad, a touch sensitive screen, a touch pad, a mouse or other pointing device.

In some embodiments, the one of more software programs for the user interface 20 does not communicate directly with the integrated development environment 18. Rather, the user interface 20 interacts and communicates with the integrated development environment 18 through an interface agent 22. For example, the software programs for the user interface 20 may be written in a language that is incompatible for direct interaction with the integrated development environment 18.

Referring again to FIG. 1, the interface agent 22 is stored in the memory of the host computer 16 and facilitates a communications linkage between the user interface 20 and the integrated development environment 18. The communication interface agent 22 enables communication between separate software processes running in association with the user interface 20 on the one hand and in the integrated development environment 18 on the other hand. As explained below, the communication interface agent 22 is configured to extend or make available functions within the integrated development environment 18 to the user interface 20. Such functions extended to the user interface 20 include without limitation manipulation of memory, any peripherals, and registers associated with the target microcontroller 12.

The interface agent 22 may be embodied in an assembly of electronic components, including memory devices, that are an integral part of the host computer. In other embodiments, the interface agent 22 is embodied in an assembly of electronic components, including memory devices, that is separate and distinct from the host computer.

Referring again to FIG. 1, the interface agent 22 includes a first software component 24 that utilizes Component Object Model (COM) technology, such as those in the Microsoft Windows-family of Operating Systems. COM also refers to a language-neutral method of implementing program objects for use in application different from the application in which the program objects were created. Through the first software component 24, the user interface 20 may control and receive data from the integrated development environment 18, which in turn controls and receives data from the target microcontroller 12. Thus, in some instances, the user interface 20 can, to a user, appear to be interfacing directly with the target microcontroller 12 in the sense that processes of the integrated development environment 18 become transparent or are substantially unnoticed by the user.

In some embodiments, the interface agent 22 includes a second software component 26 written in Windows .NET or written for the software framework known as the Microsoft .NET Framework. The second software component 26 handles non-IDE information and allows the program for the user interface 20 to detect situations or events occurring outside of the link between the integrated development environment 18 and the first software component 24. Non-IDE information includes, for example, information regard the status of a window of the IDE/GUI 19. Non-IDE information does not include tool control and data, and does not include target control and data, as those terms are later described. For example, events such as a graphical window being opened on the display screen, the actual existence of a particular file, and inactivity of a driver for the target board 14 are non-IDE information and are reported through the second software component 26 to the program for the user interface 20. Thus it will be appreciated that the user interface 20 may provide a high level of interactivity with a user by monitoring for the occurrence of an event that is expected to occur after the user is requested to perform a certain task, and by the communicating to the user a message that depends upon whether the event has occurred.

In FIG. 1, the target board 14 can be a demonstration board, an experimentation board, a test board, a prototype, a consumer product, a subassembly for an industrial application, or any other assembly containing a target microcontroller.

It is to be understood that other embodiments of the present invention include variations of the embodiments described above, but with a microprocessor, instead of a microcontroller, being the target device on target board 14.

Figure 3:
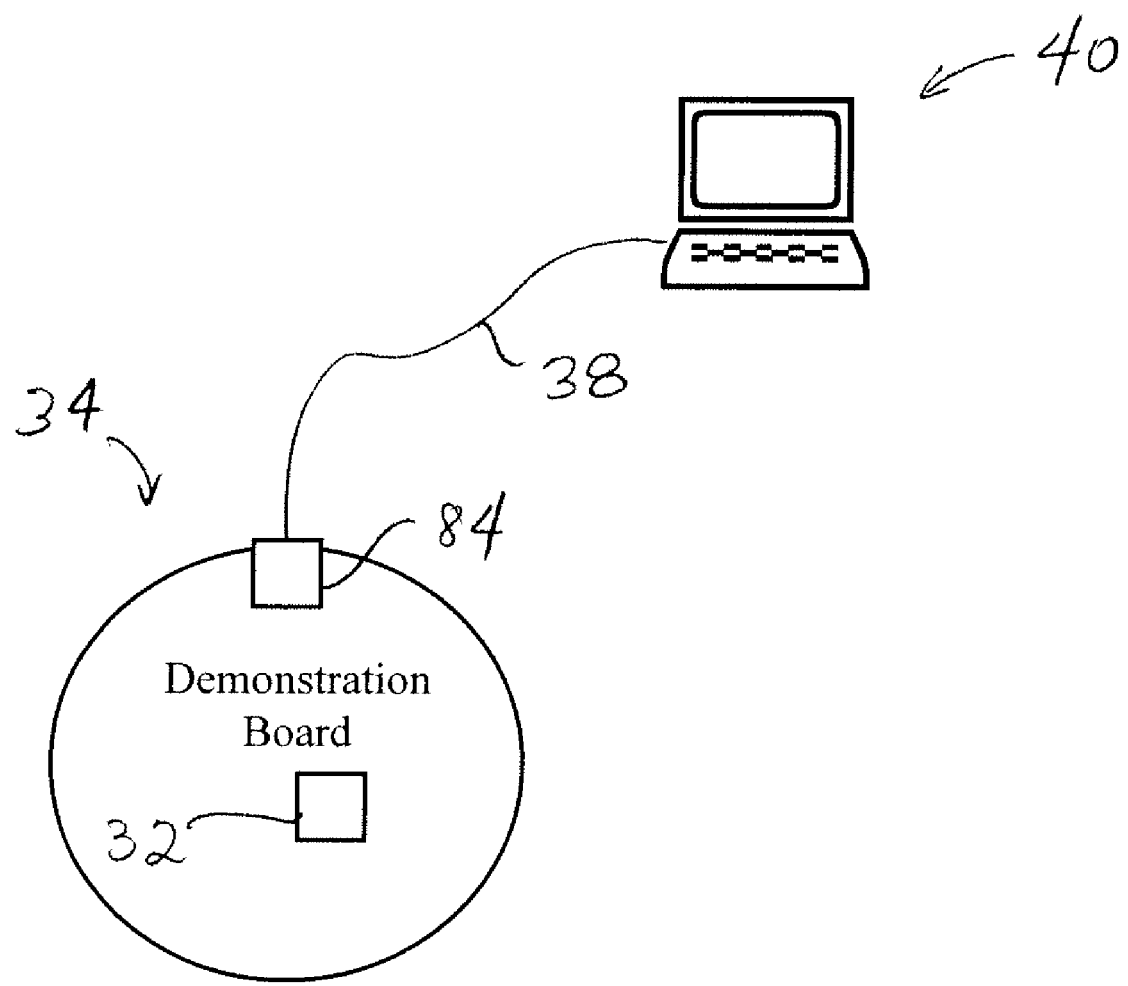
FIG. 3 is diagram showing a connection between the demonstration board of FIG. 2 with a host computer.
Figure 4:
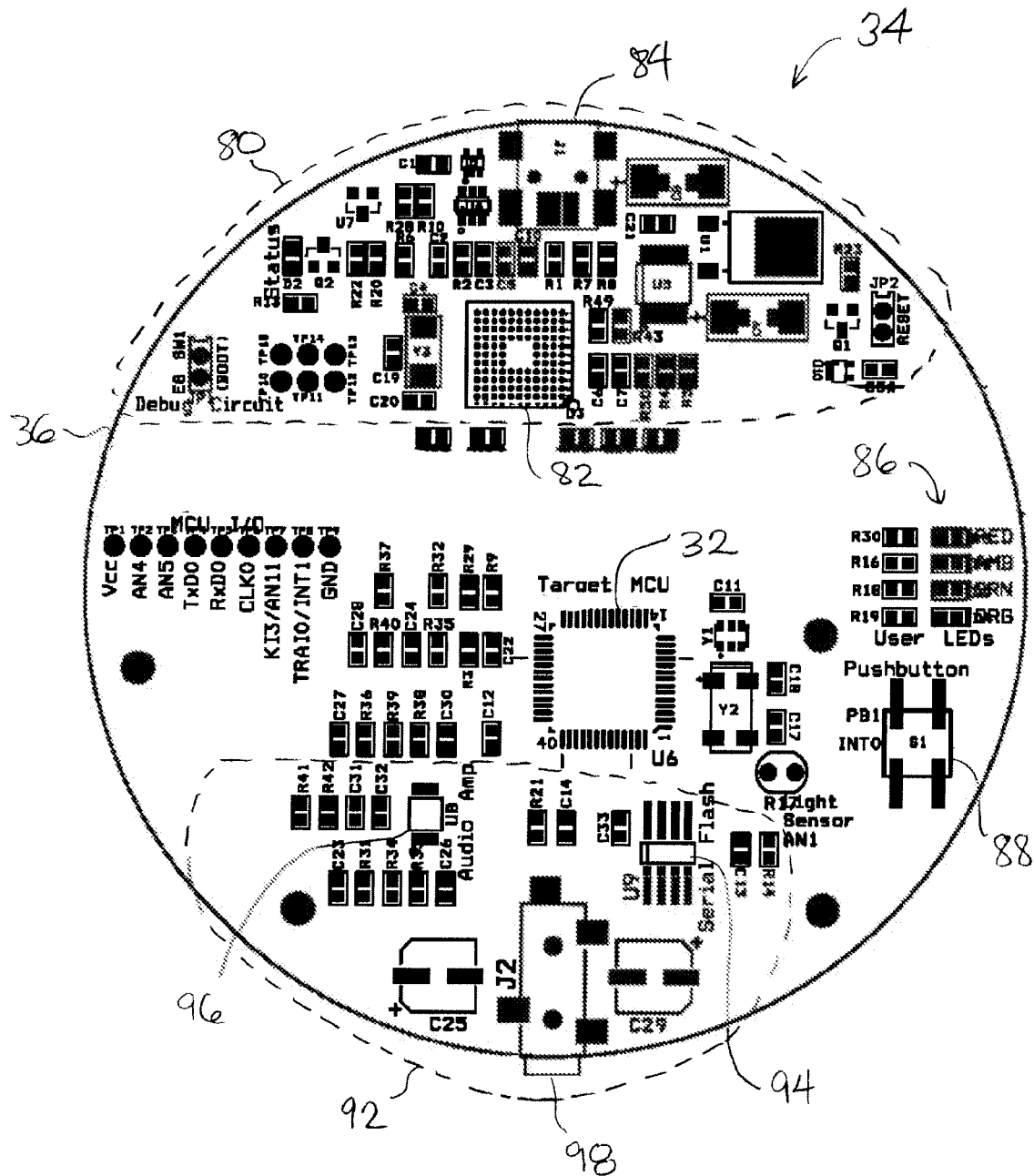
FIG. 4 is plan view of the demonstration board of FIG. 2, showing the layout of peripheral components in relation to the microcontroller.
Figure 5:
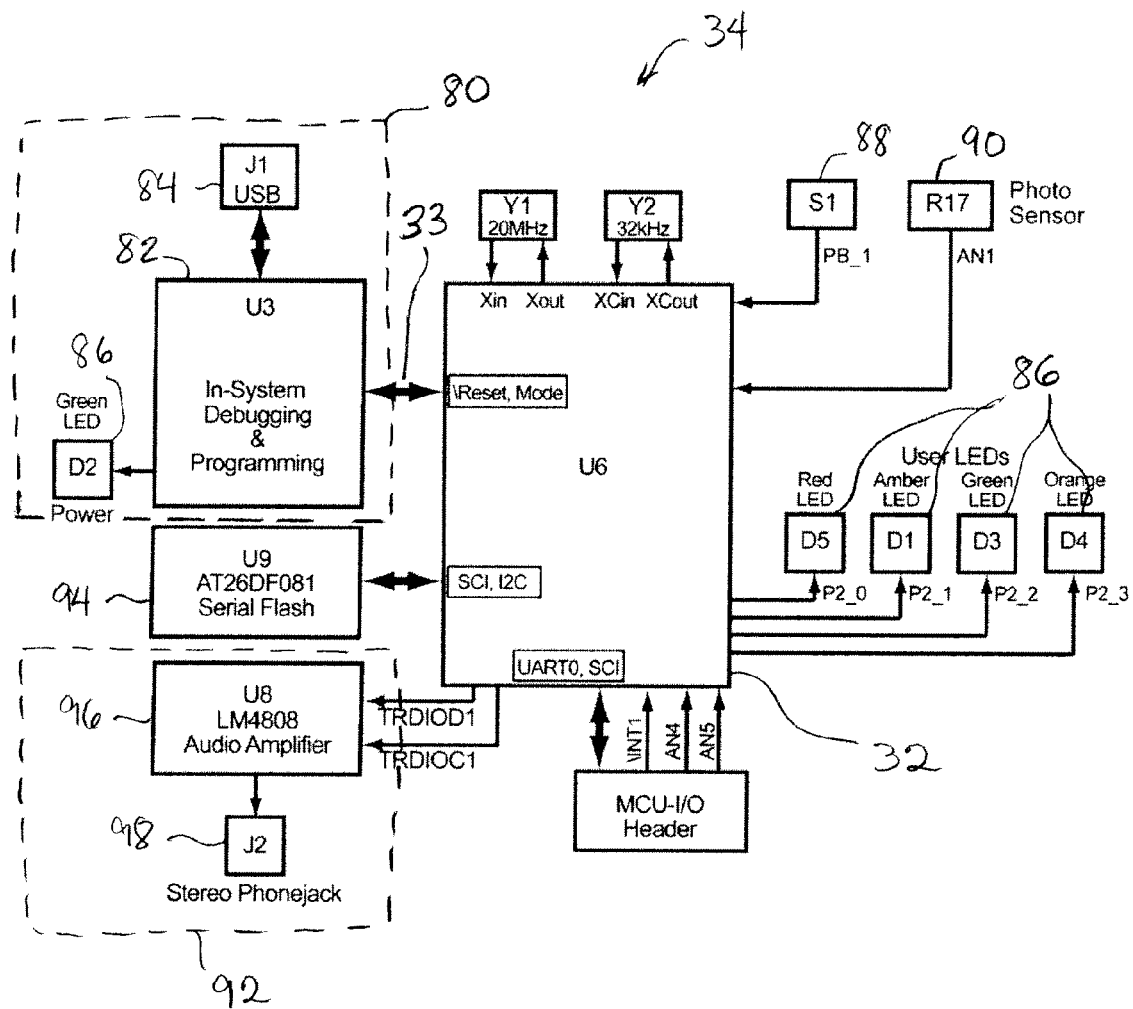
FIG. 5 is a block diagram of the demonstration board of FIG. 2.

In FIG. 2, there is shown a system 30 for communicating with a target microcontroller 32 on a demonstration board 34. As shown in FIG. 3, the demonstration board 34 may in some embodiments be connected by a mini USB cable 38 to a host computer 40. It will be appreciated that other means of connecting the demonstration board 34 to the host computer 40 may be implemented. As shown in FIGS. 4 and 5, the demonstration board 34 may in some embodiments include a printed circuit board 36 on which is mounted the target microcontroller 32 and other peripheral devices, such as light emitting diodes (LEDs), serial flash memory devices, sensors, and amplifiers.

Referring again to FIG. 2, a multimedia user interface 39 includes a video window 42 and an audio output 44 which are controlled by ADOBE® FLASH® multimedia and Extensible Markup Language (XML) scripts 46 stored in a data storage device or memory of the host computer 40. The video window 42 is generated or displayed on a display screen on or remotely connected to the host computer 40 in accordance with video data 50 from the multimedia program 46. The audio output 44 is generated through speakers on or remotely connected to the host computer 40 in accordance with audio data 52 from the multimedia program 46.

The video window 42 is configured to obtain user input 54 from the user and to communicate the user input to the multimedia program 46. User input 54 may be generated in response to user entries or stimuli obtained through a keyboard, a keypad, a touch sensitive screen, a touch pad, a mouse or other pointing device operatively connected to the host computer 40. The user input 54 may be a response by a user to a text, graphical and/or audio message or prompt generated in accordance with the video data 50 and/or audio data 52.

An interface software program 56 is also stored in the memory of the host computer 40. The interface software program 56 is adapted to receive and provide window control data 58 from and to the video window application 42. In some embodiments, the interface software program 57 is written in Windows .NET or written for the software framework known as the Microsoft .NET Framework.

Referring again to FIG. 2, the interface software program 56 may detect a window control event 58, such as a change in open/close status of a graphical window shown on the display screen of the host computer 40, and report such an event or status via a master control path 60 to the multimedia program 46. Also, in response to a query from the multimedia program 46, the interface software program 56 may request from the video window 42 an indication of the status of a graphical window on the display screen of the host computer 40.

The interface software program 56 is also adapted to provide and receive window control data 62 to and from an integrated development environment (IDE) 64. The integrated development environment 64 comprises software program components, referred to as development tools, for editing, assembling, linking, debugging, compiling, and analyzing a software program to be downloaded to the memory of the target microcontroller 32. The interface software program 56 may detect an IDE window control event 52, such as a dialog box pop-up event and the open/close status of a graphical window associated with tools, utilities, and functionalities of the IDE 64, and report such an event or status via the master control path 60 to the multimedia program 46. Also, in response to a query from the multimedia program 46, the interface software program 56 may request that the IDE 64 start or stop execution.

A target server program 66 is also stored in the memory of the host computer 40. The target server program 66 interacts with the interface software program 56 and the integrated development environment 64. In some embodiments, the target server program 66 is a Component Object Model (COM) module and utilizes COM technologies, such as those in the Microsoft Windows-family of Operating Systems. In this way, data may be communicated by the target server program 66 through a COM interface standard that enables interprocess communication and dynamic object creation in various programming languages compatible with the integrated development environment 64 and the multimedia program 46.

Referring again to FIG. 2, the target server program 66 provides and receives tool and target data 68 to and from the interface software program 56. Tool data 68 includes information relating to or associated with the operation of the development tools, which are software program components of the integrated development environment (IDE) 64. Examples of such tool data 68 include without limitation, values for populating parameters or variables for operating development tools of the integrated development environment 64. Target data 68 includes information relating to or associated with the target microcontroller 32 and/or other electronic devices on the demonstration board 34. Examples of such target data 68 include without limitation, values of parameters and variables obtained from the target microcontroller memory. A particular example of target data 68 are values of a signal communicated by the target microcontroller 32 to one of the peripheral devices connected to the target microcontroller. Another example of target data 68 are values for populating memory registers or parameters of the target microcontroller 32.

Tool and target data 68 provided to the interface software program 56 are relayed through the master control path 60 to the multimedia program 46, thereby allowing the multimedia program 46 to utilize and/or display the target data 68 as appropriate. For example, the real-time value of a signal or parameter communicated by the target microcontroller to a peripheral device may be displayed to a user in a graphical window or audibly communicated to the user as audio output in accordance with the multimedia program 46. As a further example, target data 68 may be the value of a signal or parameter communicated by the target microcontroller to a peripheral LED on the demonstration board 34. This target data 68 may be used by the multimedia program 46 to emulate or simulate the expected on/off/blinking status of the LED in a video representation of the demonstration board 34. As described in more detail below, the demonstration board 34 includes a peripheral photo sensor connected to the target microcontroller 32, and, in some embodiments, the parameter value displayed in the graphical window may relate to the amount of light detected by the photo sensor.

The target server program 66 also provides and receives tool and target controls 70 to and from the first software program 56. Tool controls 70 are data relating to or associated with the operation or control of the development tools of the integrated development environment 64. Examples of tool controls 70 include without limitation, a command to build a program from a particular source code, and a command to transmit the program to the demonstration board 34. Target controls 70 are data relating to or associated with the control of the target microcontroller 32 and/or other electronic devices on the demonstration board 34. For example, a target control 70 may cause a program that has been transmitted to the demonstration board 34 to be written to the flash memory of the target microcontroller 32. As described in more detail below, the demonstration board 34 includes a light emitting diodes (LEDs) connected to the target microcontroller 32, and a particular target control 70 may stimulate or cause the target microcontroller 32 to change the activation status of the LEDs between on, off, and blinking.

As indicated in the above example, the integrated development environment 64 provides and receives tool and target control and data 72 to and from the target server program 66. In some instances, the control and data 72 received by the integrated development environment 64 was translated, converted, or generated from control and data 70, 68 received by the target server program 66 from the interface software program 56.

Still referring to FIG. 2, the integrated development environment 64 provides and receives information, referred to as target control and data 74, to and from the demonstration board 34. In some instances, the control and data 74 received by the demonstration board 34 was translated, converted, or generated from control and data 72 received by the integrated development environment 64 from the target server program 66. Examples of a target control 74 include without limitation, a command to manipulate memory, any peripherals, and registers associated with the target microcontroller 32.

As described in more detail below, the demonstration board 34 includes a pushbutton switch operatively connected to the target microcontroller 32. In a non-limiting example, a graphical window displayed in accordance with the multimedia program 46 may include a graphical representation of the pushbutton switch on the demonstration board 34. A user may interact with the graphical representation on the video window 42 by manipulating a pointing device operatively connected to the host computer 40, resulting in user input 54 indicating a change in the activation status of the graphical representation. This user input 54 may be relayed by the multimedia program 46 and the interface software program 56 to the target server program 66 as shown in FIG. 2. The user input 54 is translated, converted, or utilized to generate a corresponding target control 72 for use by the integrated development environment 64, which through a corresponding manipulation of memory and/or registers associated with the target microcontroller 32, causes or stimulates the target microcontroller 32 to operate as if the actual pushbutton on the demonstration board 34 was physically manipulated by the user.

FIGS. 4 and 5 show a non-limiting example of the layout and block diagram, respectively, of electronic components on the demonstration board 34. The demonstration board 34 includes a debug circuit 80 which includes electronic components adapted to write a program to the flash memory of the target microcontroller 32 and to aid in debugging of the programmed target microcontroller 32. The debug circuit 80 includes an in-system debugging and programming microcontroller, referred to herein as a programming processor 82, which is operatively connected to a debug interface 33 of the target microcontroller 32. Connecting the host computer 40 to the target microcontroller 32 exclusively through the debug interface 32 allows functions and pins of the target microcontroller 32 to be tested with the microcontroller 32 in full operation. As indicated in FIG. 5, those other pins of the target microcontroller can be connected to other electronic devices, such as LEDs, switches, sensors, flash memory, and oscillators, to test and evaluate the target microcontroller 32 and software functions.

In aspects of the present invention, the debug interface 33 is a pre-existing, built-in element and an integral part of the target microcontroller 32 and is, thus, distinct from a serial port that would be coupled to dedicated pins of the target microcontroller 32. Thus, the connection through the debug interface 33 is less intrusive than a serial port connection. A serial port connection would typically require additional circuitry, including a level shifter and many passive components, and a COMM port connector (DB9, DB15). Such components are unnecessary when connecting to the pre-existing debug interface of the target microcontroller 32.

It will be appreciated that the particular model, specifications, and function of the target microcontroller 32 and programming processor 82 may vary, as the system and method of the present invention may be implemented with many different microcontroller models and types. The target microcontroller 32 can be any microcontroller selected by the user for evaluation, development, and testing purposes. A non-limiting example of a microcontroller suitable for use as the target microcontroller 32 is the R5F21258SNFP microcontroller from Renesas Technology Corp., Tokyo, Japan. A non-limiting example of a microcontroller suitable for use as the programming processor 82 is the HD64F2215RUBR microcontroller from Renesas Technology Corp., Tokyo, Japan.

The programming processor 82 includes a Universal Serial Bus (USB) interface to support flash memory programming via USB. A mini USB connector 84 from the host computer 40 is operatively connected to the USB interface. A power status LED 86 is operatively connected to the programming processor 82.

For interaction with a user, the demonstration board 34 includes peripheral devices, namely four LEDs 86 of different colors, a pushbutton 88, and a light sensor or photo sensor 90, all of which are operatively connected to the target microcontroller 32. Other peripheral devices are part of an audio circuit 92 that includes an amplifier 96 which is operatively connected to the target microcontroller 32. A stereo phone-jack or headphone jack 98 is operatively connected to the audio amplifier 96.

The demonstration board 34 also includes a serial memory device 94, such as an EEPROM, which may store audio data that can be used by the target microcontroller 32 to play an audible message through the headphone jack 98.

In some embodiments, the serial memory device 94 is preloaded by the demonstration board manufacturer with audio instructions for using the demonstration board 34. In some embodiments, a user may conduct experiments and projects in which user selected audio data is written to the serial memory device 96 through a Windows application communicating with the interface software program 56 and target server program 66 of FIG. 2.

Figure 6:
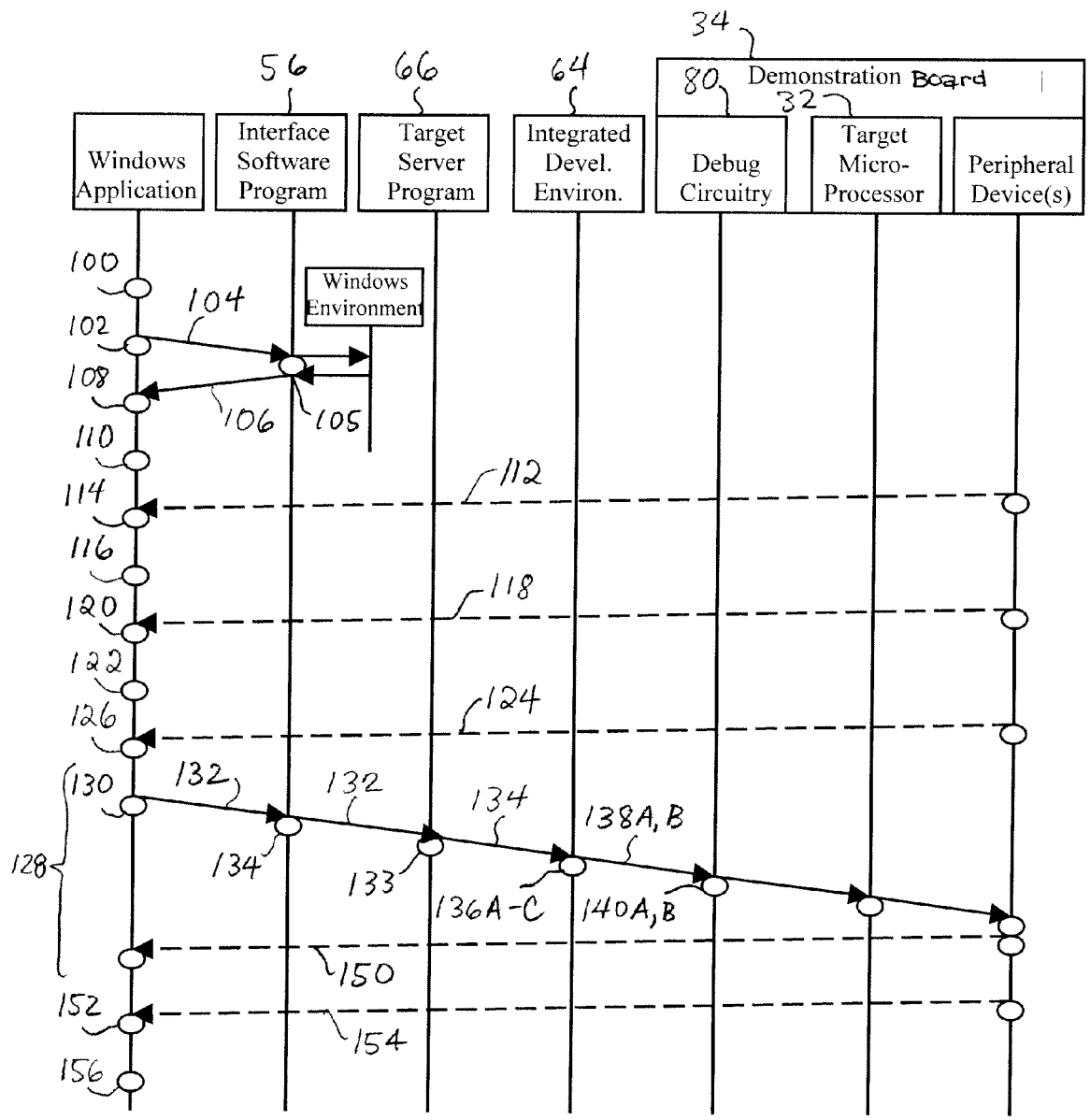
FIG. 6 is a flow diagram of a method for communicating with a microcontroller.

FIG. 6 depicts an embodiment of a method for communicating with a microcontroller in accordance with aspects of the invention. Although the method will be described in connection the system 30 of FIG. 2, it will be appreciated that other systems may be used to implement the method.

In FIG. 6, the method for communicating with the microcontroller functions as a hardware and software verification test of a demonstration board 34 for a particular model or type of target microcontroller 32. The method includes running a Windows application on a host computer 40. The Windows application may incorporate a multimedia program 46 that provides a user with a text, graphical and/or audio messages, prompts, and interactive form elements.

The Windows application may prompt the user for the particular model number of the demonstration board 34. Thereafter, the Windows application verifies the correct installation and configuration of hardware and software associated with the demonstration board 34, such as an interface software program 56, target server program 66, integrated development environment 64, and software written in the flash memory of the target microcontroller 32 and other devices on the demonstration board 34. To do so, the Windows application prompts or requests 100 the user to connect a mini USB connector 84 on the demonstration board 34 to the host computer 40 using a mini USB cable 38. The Windows application then monitors 102 whether the user has performed the requested task by sending an instruction 104 to the interface software program 56 to determine whether a USB driver for the demonstration board 34 is active on the host computer 40. If the USB driver is inactive, the Windows application displays a troubleshoot button that is hyperlink, i.e., a Internet navigation reference, to a web page containing information for correcting a USB connection problem and for identifying a hardware problem, such as damage to the USB connector 84. When the USB driver is active, the interface software program 56 provides 105 data 106 representative of the active status to the Windows application, which causes the Windows application to proceed.

After receiving 108 the indication that the user has properly connected the demonstration board 34 to the host computer 40, the Windows application asks 110 the user to verify that the power status LED 86 on the demonstration board 34 is illuminated. The Windows application causes a buttons labeled "Troubleshoot" and "Green Status is ON." The "Troubleshoot" button may be hyperlink to a web page containing information for correcting potential problems. The user provides positive feedback 112 regarding hardware status by clicking on the "Green Status is ON" button, after which the Windows application proceeds. The broken lines in FIG. 6 represent user feedback regarding a peripheral device on the demonstration board 34. In operation, the user feedback is not transmitted from the peripheral device, rather the user feedback is in the form of user input through a video window 42 of the host computer 40.

After receiving 114 the positive feedback 112 from the user, the Windows application asks 116 the user to verify that a particular program is already written in the flash memory of the target microcontroller 32. Among other things, the program is expected to cause the target microcontroller to control two of the LEDs 86 operatively connected to it to blink. Thus, to verify that the desired program is in the target microcontroller 32, the Windows application asks the user to verify that two LEDs 86 are blinking as expected. The Windows application causes a buttons labeled "Troubleshoot" and "Two LEDs are Blinking." The "Troubleshoot" button may be hyperlink to a web page containing instructions for the user to load factory default software program into the target microcontroller 32. The user provides positive feedback 118 regarding software status by clicking on the "Two LEDs are Blinking" button, after which the Windows application proceeds.

After receiving 120 the positive feedback 118 from the user, the Windows application asks 122 the user to verify that the target microcontroller 32 and the photo sensor 90 are functioning properly. When functioning properly, the blink rate of the two LEDs 86 changes in relation to the amount of light received by the photo sensor 90. Thus, to verify that there is no damage to the target microcontroller 32, photo sensor 90, and/or other areas of the printed circuit board 36, the Windows application asks the user to verify that the blink rate of two LEDs 86 changes when the user covers the photo sensor 90. The Windows application causes a buttons labeled "Troubleshoot" and "LEDs Blinking Rate Changed" The "Troubleshoot" button may be hyperlink to a web page containing information for correcting potential problems, such as a loose connection between the circuit board 36 and the photo sensor 90. The user provides positive feedback 124 regarding hardware status by clicking on the "LEDs Blinking Rate Changed" button, after which the Windows application proceeds.

With continued reference to FIG. 6, after receiving 126 the positive feedback 118 from the user, the Windows application verifies 128 that the software stored and operating within the host computer 40 is compatible with the demonstration board 34. To perform this compatibility verification, the Windows application causes the on-chip flash memory of the target microcontroller 32 to be erased and written with a new program. The Windows application sends 130 data 132 to the interface software program 56. The interface software program 56 forwards 133 the received data 132 to a target server program 66. The target server program 66 translates the received data 132 and sends corresponding control data 134 recognizable by the integrated development environment 64. The control data 132 causes the integrated development environment 64 to:

(A) load 136A source code for compatibility verification from the memory of the host computer 40;
(B) build 136B a program from the source code; and
(C) transmit 136C the program as target data 138A to the debug circuitry 80 on demonstration board 34.

The integrated development environment 64 also sends a control signal or parameter 138B that causes the programming processor 82 of the debug circuitry 80 to erase then write 140A the program in the on-chip flash memory of the target microcontroller 32.

Among other things, the new program that was downloaded to the target microcontroller 32 is expected to cause the target microcontroller to control two of the LEDs 86 operatively connected to it to blink. Thus, to verify that the above described steps of the compatibility verification process 128 were completed, the Windows application asks the user to verify that two of the LEDs 86 are blinking as expected. The Windows application causes a buttons labeled "Troubleshoot" and "Blinking." The "Troubleshoot" button may be hyperlink to a web page containing instructions for the user to resolve potential problems. The user provides positive feedback 150 regarding software compatibility by clicking on the "Blinking" button, after which the Windows application proceeds.

The new program that was downloaded to the target microcontroller 32 is also expected to cause the LEDs to stop blinking and causes the audio message stored in the serial memory device 94 to be played through the headphone jack 98 after the pushbutton 88 is pressed. To further verify hardware and software configuration and to verify that the target microcontroller 32 and the pushbutton switch 88 are functioning properly, the Windows application asks 152 the user press the pusbutton 88 and verify that the LEDs 86 stop blinking and that the audio message is played through the jack 98 as expected. The Windows application displays three buttons labeled "LEDs Stopped Blinking," "No Audio" and "LEDs Still Blinking." The "No Audio" and "LEDs Still Blinking" buttons may be hyperlinks to a web page containing instructions for the user to identify potential causes of the problem. The user provides positive feedback 154 in response to the request 152 by clicking on the "LEDs Stopped Blinking" button, after which the Windows application indicates 156 to the user that verification testing of hardware and software for the demonstration board 34 has been successfully completed.

In some embodiments, the new program that was written 140A in the on-chip flash memory of the target microcontroller 32 included a monitor program, also referred to as a kernel. The integrated development environment 64 communications with the kernel on the Read-Only Memory (ROM) area of the target microcontroller 32 through the debug interface 33. This communication scheme with the kernel allows for source-level debugging for assembly and C language, single-step command with unlimited software breakpoints, run command with some event breakpoints, Random-Access Memory (RAM) monitor function, a C variable "watch" window.

Figure 7:
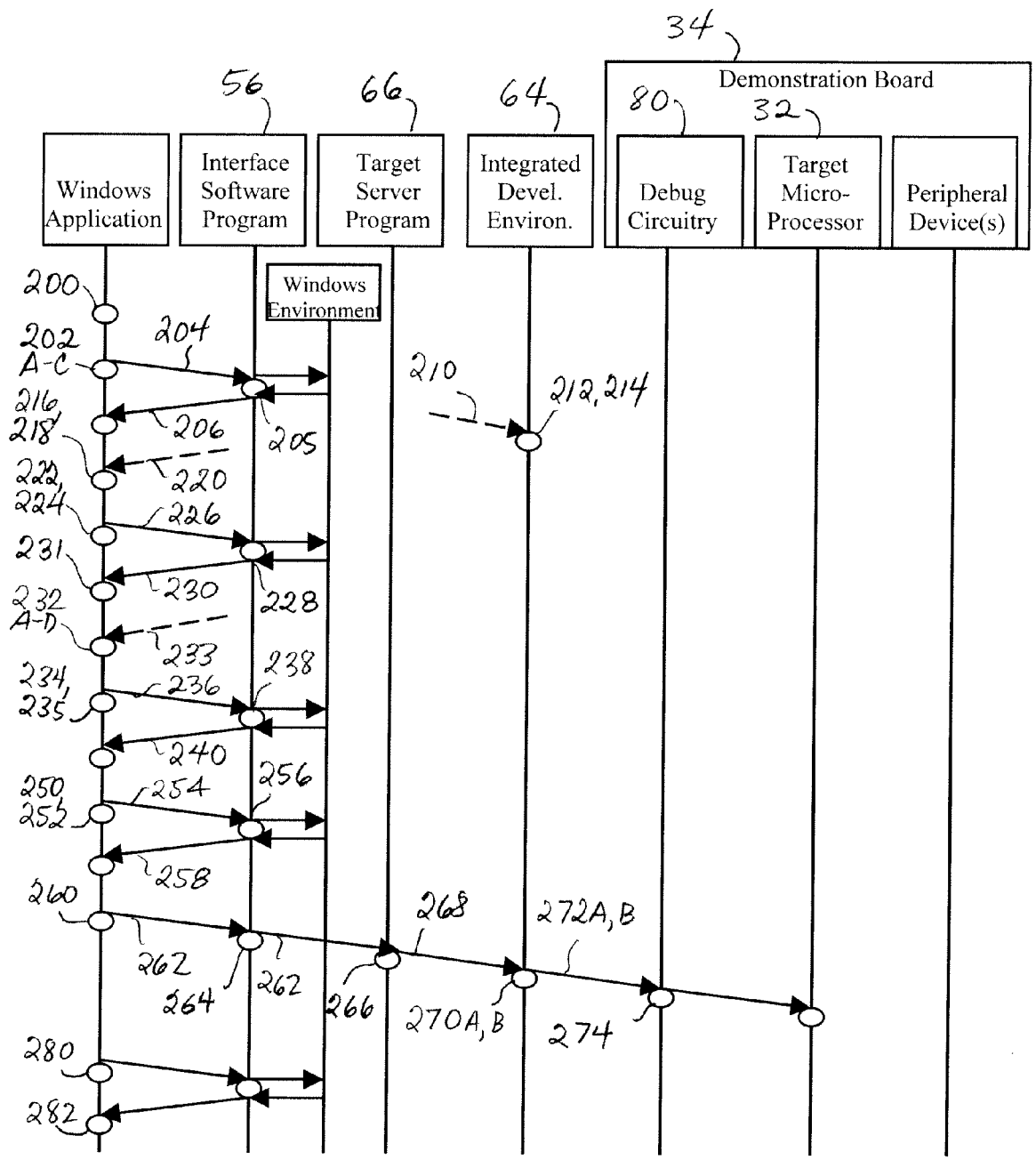
FIG. 7 is a flow diagram of another method for communicating with a microcontroller.

FIG. 7 illustrates an embodiment of a method for communicating with a microcontroller in accordance with aspects of the invention. Although the method will be described in connection the system 30 of FIG. 2, it will be appreciated that other systems may be used to implement the method.

In FIG. 7, the method for communicating with the processor serves to demonstrate features of an integrated development environment 64 and uses for a demonstration board 34 for a target microcontroller 32. The method includes running a Windows application on a host computer 40. The Windows application may incorporate a multimedia program 46 that provides a user with a text, graphical and/or audio messages and prompts.

To acquaint a user with the integrated development environment (IDE) 64, the Windows application requests 200 the user to find and click an icon on the host computer display screen in order to start the integrated development environment. The Windows application then monitors 202A whether the user has performed the requested task by sending an instruction 204A to the interface software program 56 to determine whether a graphical window for the IDE 64 has opened on the display screen of the host computer 40. If the IDE window has not opened, the Windows application continues to prompt the user to click on the IDE icon on the Windows desktop. When IDE window has opened, the interface software program 56 provides 205A data 206A representative of the opened window status to the Windows application, which causes the Windows application to proceed.

Next, the IDE displays a Welcome dialog box presenting the user with various options for using the IDE. The Windows application explains these options and requests 202B the user to select particular options for the tutorial already in progress. Upon making the selection, the Welcome dialog box closes. The Windows application monitors for closure of the Welcome dialog box through the interface software program 56. The interface software program 56 sends 205B data 206B representative of the dialog box closed status to the Windows application, which causes the Windows application to proceed.

The IDE 64 continues to go through various setup dialog boxes and pop-up windows that present the user with additional options for using the IDE. As with the Welcome dialog box, the Windows application explains these additional options and requests 202C the user to make particular text entries and/or menu selections. The interface program 56 sends 205C data 206C representative of closed status for the various dialog boxes to the Windows application, which causes the Windows application to proceed.

The prior selections and entries 210 made by the user causes the IDE 64 to load 212, from memory of the host computer 40 to the IDE, a sample development project, including associated data files and tutorial source code. The IDE displays 214 a unified graphical user interface with multiple windows for one or more development tools, such as a source code editor, compiler, linker, and debugger. The windows of the unified graphical user interface are separate and distinct from any window of the multimedia program 46 and include graphical elements that are not part of any window of the multimedia program 46. The Windows application proceeds by explaining 216 the contents and control tabs of the various windows.

In some embodiments, the unified graphical user interface of the IDE is an integral part of the integrated development environment in that the unified graphical user interface does not operate in the absence integrated development environment.

In FIG. 7, the broken lines represent user input made in response to a request given to the user. In operation, the user feedback is in the form of user input at one or more dialog boxes or pop-up windows shown on a video window 42 of the host computer 40.

Next, to acquaint the user with the compiling tool of the IDE 64, the Windows application requests 218 the user to select a particular file name for source code from within the graphical user interface of the IDE. To aid the user, the Windows application shows a close-up picture of the IDE graphical user interface and highlights the location of the filename which should be selected by the user. The picture is displayed by the Windows application within a FLASH® multimedia Window running above or over the IDE graphical user interface. When the user selects the particular file name, the source code is shown in an editor window of the IDE graphical user interface. The Windows application prompts the user to press a "Continue" button to allow the tutorial to proceed.

After pressing 220 the "Continue" button, the Windows application requests 222 the user to build a program from the source code appearing in the editor window. The FLASH® multimedia Window shows a close-up of the IDE graphical user interface and highlights the location of the icon for starting the build process. The build process involves compiling the source code using the compiler of the IDE. The build process concludes with the creation of a particular program file that is downloadable to the demonstration board 34. This downloadable program file is stored by the IDE in the memory of the host computer 40.

Still referring to FIG. 7, the Windows application then monitors 224 whether the user has performed the requested task of pressing the build icon. The monitoring step involves sending an instruction 226 to the interface software program 56 to determine whether the expected downloadable program file exists. If the downloadable program file does not exist, the Windows application continues to tell the user that it is waiting for the build process to complete. When the downloadable program file is created, indicating that the build process has completed, the interface software program 56 provides 228 data 230 indicating build completion to the Windows application, which causes the Windows application to proceed.

To acquaint the user with the debugging tool of the IDE 64, the source code for the tutorial project intentionally contained programming errors, resulting in the build status window of the IDE graphical user interface to show that a number of errors occurred during the build. The FLASH® multimedia Window generated by the Windows application plays 231 an audio message with animation that brings to the user's attention the error text message in the build status window. Next, the FLASH® multimedia Window then:

(A) directs 232A the user to a "Next Error" icon in the IDE graphical user interface for finding the location of errors;
(B) requests 232B that the user press the "Next Error;"
(C) directs 232C the user to the editor window which has scrolled down to the corresponding location of the error in the source code; and
(D) instructs 232D the user how to remove the error using the editor.

At various points in the above sequence of steps, the FLASH® multimedia Window prompts to user to press a "Continue" button on the multimedia Window to allow the user to perform a step prior to hearing instructions for the next step. The Windows application proceeds to give the next step in the above sequence when the user has pressed 233 the "Continue" button. The above sequence of steps may be repeated depending upon the number of intentional errors were included in the tutorial source code that was previously compiled.

Still referring to FIG. 7, after all errors or bugs have been removed, the FLASH® multimedia Window request 234 the user perform another build by pressing the build icon once again, and then monitors 235 whether the user has performed the requested task of pressing the build icon. The monitoring step involves sending an instruction 236 to the interface software program 56 to determine whether the expected downloadable program file was created. When the downloadable program file is created, indicating that the build process has completed, the interface software program 56 provides 238 data 240 indicating build completion to the Windows application, which causes the Windows application to proceed.

Next, to instruct the user how to establish a connection from the IDE 64 to a particular target device, such as the demonstration board 64, the Windows application continues by guiding the user in making the appropriate selections and entries in various pop-up windows and dialog boxes. This process includes:

(A) requesting 250 the user to make entries and selections, including without limitation selections for the type of target device, selections for erasing and writing to flash memory of the selected target device, and selections for providing power to the selected target device.
(B) sending 252 an instruction 254 to the interface software program 56 to determine whether a graphical window for the IDE 64 has opened or closed on the display screen of the host computer 40; and
(C) when an IDE graphical window has opened or closed, the interface software program 56 provides 256 data 258 about the window status to the Windows application, which causes the Windows application to proceed.

The above sequence of steps may be repeated depending upon the number of pop-up windows and dialog boxes are expected to be encountered in the tutorial.

Next, the Windows application sends 260 data 262 to the interface software program 56. The interface software program 56 forwards 264 the received data 262 to a target server program 66. The target server program 66 translates 266 the received data 262 and sends corresponding control data 268 recognizable by the IDE 64. The control data 268 causes the IDE to download 270A the downloadable program file 272A created from the second build process. The IDE also sends 270B a control signal or parameter 272B which causes a programming processor 82 to erase and write 274 the program 274 contained in the downloadable file to the on-chip flash memory of the target microcontroller 32.

Also, the IDE may detect whether downloading was successful and communicate information indicating success or failure to the integrated development environment 64. Information regarding downloading success or failure may then be obtained by the Windows application, through the target server program 66, to trigger display of a predetermined message to the user and/or to provide further data instructing the IDE attempt another download.

The multimedia tutorial may end with the Windows application requesting 280 the user to close the IDE 64. Upon detecting 282 by means of the interface software program 56 that the IDE graphical user interface window has closed, the Windows application may conclude with further explanation of other functionalities, utilities, and capabilities of the IDE.

It is to be understood that other embodiments of the present invention include variations of the embodiments previously described herein, but with a microprocessor, instead of a microcontroller, being the target device on demonstration board 34.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A system for communicating with a microdevice, the system comprising:
    a host computer configured to communicate with a target microdevice, the target microdevice comprising a microcontroller or a microprocessor, the host computer comprising a host memory, a graphical user interface configured to obtain user inputs from a user, an interface agent configured to handle information flow between the graphical user interface and an integrated development environment stored in the host memory;
    wherein the integrated development environment is configured to compile source code to build a target program according to information from the graphical user interface and,
    when the host computer is connected to the target microdevice, the host computer is further configured to download the target program through a debug interface to the target microdevice according to the information from the graphical user interface;
    wherein the interface agent comprises a first software component and a second software component, the first software component handling information to operate the integrated development environment, the second software component handling non-IDE information about window status and file creation status.

2. The system of claim 1, wherein the graphical user interface includes graphical elements that are not part of a user interface to the integrated development environment.

3. The system of claim 1, wherein the interface agent facilitates language-neutral handling of the information flow between the graphical user interface and the integrated development environment.

4. The system of claim 1, wherein the graphical user interface includes a multimedia software program stored in the host memory, wherein the multimedia software program is capable of operating without the integrated development environment.

5. The system of claim 1, wherein the graphical user interface includes a multimedia software program stored in the host memory.

6. The system of claim 1, wherein the first software component handles a user input from the graphical user interface and provides information to operate the integrated development environment in accordance with the user input.

7. The system of claim 1, wherein the graphical user interface is configured to display information obtained from the target microdevice, the first software component facilitating language-neutral handling between the graphical user interface and the integrated development environment of the information to be displayed.

8. The system of claim 1, wherein the second software component handles information about window status and file creation status and provides the information to the graphical user interface.

9. The system of claim 1, wherein the host computer is configured to communicated with the target microdevice through a debug interface of the target microdevice, and the integrated development environment is configured to download the target program through the debug interface to the target microdevice.

10. The system of claim 9, further comprising a target platform carrying both the target microdevice and a programming processor operatively connected to the debug interface and the host computer, the programming processor configured to perform erase and write operations in accordance with information from the integrated development environment.

11. The system of claim 10, wherein the target platform is a printed circuit board disposed outside of the host computer.

12. A system for communicating with a microdevice, the system comprising:
a host computer configured to communicate with a target microdevice, the target microdevice comprising a microcontroller or a microprocessor, the host computer comprising a host memory, a graphical user interface configured to obtain user inputs from a user, an interface agent configured to handle information flow between the graphical user interface and an integrated development environment stored in the host memory;
wherein the integrated development environment is configured to compile source code to build a target program according to information from the graphical user interface and,
when the host computer is connected to the target microdevice, the host computer is further configured to download the target program to the target microdevice according to the information from the graphical user interface;
a target platform carrying both the target microdevice and a peripheral device operatively connected to the target microdevice, the peripheral device selected from the group consisting of a light emitting diode, a sensor, a switch, and a serial memory device.

13. The system of claim 12, wherein the host computer is configured to communicated with the target microdevice through a debug interface of the target microdevice, the integrated development environment is configured to obtain through the debug interface information from the target microdevice about the operational status of the peripheral device, and the graphical user interface is configured to display information representative of the information obtained by the integrated development environment about the operational status of the peripheral device.

14. A system for communicating with a microdevice, the system comprising: a host computer comprising a host memory, a graphical user interface configured to obtain user inputs from a user, an interface agent configured to handle information flow between the graphical user interface and an integrated development environment stored in the host memory; and a target microdevice that is not part of the host computer, the host computer configured to communicate with the target microdevice, the target microdevice being a microcontroller or a microprocessor; wherein when the host computer is connected to the target microdevice, the integrated development environment is configured to download a target program to the target microdevice according to information from the graphical user interface; wherein the interface agent operates in accordance with an interface software program stored in the host memory, the interface software program configured to detect graphical window status and file creation status and configured to provide information to the graphical user interface about the detected graphical window status and file creation status.

15. The system of claim 14, wherein the target microdevice comprises a debug interface, the host computer is configured to communicate with the microdevice through the debug interface, and the integrated development environment is configured to download the target program through the debug interface.

16. The system of claim 14, wherein the interface agent operates in accordance with a target server program stored in the host memory, the target server program processes a user input from the graphical user interface and provides information to operate the integrated development environment in accordance with the user input.

17. The system of claim 14, wherein the interface agent operates in accordance with a target server program stored in the host memory, the graphical user interface is configured to display information obtained from the target microdevice through the integrated development environment and the target server program, and the target server program facilitating language-neutral handling of flow between the graphical user interface and the integrated development environment of the information to be displayed.

18. A method of communicating with a microdevice, the method comprising: displaying a graphic window on a display screen of a host computer; requesting through the graphic window that a user establish a communication link from the target microdevice, to the host computer, the target microdevice comprising a microcontroller or a microprocessor; determining whether the user has established the communication link by monitoring for active status of an expected device driver required to establish the communication link; determining whether a software program in the target microdevice has a desired configuration by having the user confirm an expected operational status of a peripheral device operatively connected to the target microdevice, the expected operational status defined by the desired configuration of the software program.

19. The method of claim 18, further comprising establishing the communication link through a debug interface of the target microdevice.

20. The method of claim 18, wherein the monitoring is accomplished by an interface agent in the host computer, the interface agent interacting with a program controlling the graphic window, the interface agent configured to detect the active status of the expected device driver.

21. A method of communicating with a microdevice, the method comprising: displaying a graphic window on a display screen of a host computer, the host computer in communication with a target microdevice, the target microdevice comprising a microcontroller or a microprocessor; requesting through the graphic window that a user open an integrated development environment application, the integrated development environment application comprising a compiler; verifying that the user has opened the integrated development environment application by monitoring for the existence of a window on the display screen; requesting the user build a target program for the target microdevice by using the compiler of the integrated development environment application, and verifying whether the user has built the target program by monitoring whether a computer file expected to be created as part of the build exists in the host computer; wherein the monitoring is accomplished by an interface agent in the host computer, the interface agent interacting with a program controlling the graphic window, the interface software program configured to detect the existence of the expected file.

22. The method of claim 21, further comprising requesting the user to downloaded the target program into the target microdevice, and determining whether the user has downloaded the target program by having the user confirm an expected operational status of a peripheral device operatively connected to the target microdevice.

23. The method of claim 21, further comprising monitoring for success in downloading of the target program to the target microdevice.

24. A method of communicating with a microdevice, the method comprising: running a graphical user interface program on a host computer operatively connected to a target microdevice, the target microdevice comprising a microcontroller or a microprocessor; running an integrated development environment application on the host computer, the integrated development environment application capable of compiling a source code to build a target program for the target microdevice; and causing the integrated development environment application to provide or obtain target information from memory embedded in the target microdevice, the target information provided or obtained according to information flow between the graphical user interface program and the integrated development environment application; wherein the information flow between the graphical user interface program and the development application is performed with an interface agent comprising a Component Object Model (COM) module handling control instructions and data going to and from the integrated development environment application.

25. The method of claim 24, facilitating language-neutral handling of the information flow between the graphical user interface program and the integrated development environment application, wherein the graphical user interface program and the integrated development environment application operate with different programming languages.

26. A method of communicating with a microdevice, the method comprising: running a graphical user interface program on a host computer operatively connected to a target microdevice, the target microdevice comprising a microcontroller or a microprocessor; running an integrated development environment application on the host computer, the integrated development environment application capable of compiling a source code to build a target program for the target microdevice; and causing the integrated development environment application to provide or obtain target information from memory embedded in the target microdevice, the target information provided or obtained according to information flow between the graphical user interface program and the integrated development environment application, wherein the target information is provided or is obtained further according to event information provided to the graphical user interface program, the event information indicating any one of an opening or closing of a graphical window and existence of a computer file, wherein the interface agent further includes an interface software program according to a .NET framework, wherein the event information is handled by the interface software program.

27. A method of training a person to use an integrated development environment, the method comprising: displaying a graphic window on a display screen of a host computer; communicating through the graphic window to the person an explanation of a user interface integral to an integrated development environment (IDE), the IDE configured to execute a task, the task selected from the group consisting of editing a source code, compiling a program, linking a program, and assembling a program; requesting through the graphic window that the person initiate the task through the user interface of the IDE; and monitoring whether the person has initiated the task, wherein the monitoring includes determining occurrence or non-occurrence of an event, the event selected from the group consisting of window status of the user interface of the IDE and existence of an electronic file created by the IDE.

28. A method of training a person to use an integrated development environment, the method comprising: displaying a graphic window on a display screen of a host computer; communicating through the graphic window to the person an explanation of a user interface integral to an integrated development environment (IDE), the IDE configured to execute a task, the task selected from the group consisting of editing a source code, compiling a program, linking a program, and assembling a program; requesting through the graphic window that the person initiate the task through the user interface of the IDE; and monitoring whether the person has initiated the task, wherein communicating through the graphic window to the person a message having content that depends upon the occurrence or non-occurrence of the event.

\* \* \* \* \*